M. H. CARD & L. SAFFORD.

GRAIN-DOORS FOR RAILWAY CARS.

No. 7,328. Reissued Oct. 3, 1876.

Witnesses
L. B. Allyn
T. A. Smith

Miles H. Card
Levi Safford } Inventors

By Munday & Evarts

Attorneys

UNITED STATES PATENT OFFICE.

MILES H. CARD, OF FREEPORT, AND LEVI SAFFORD, OF CHICAGO, ILL.

IMPROVEMENT IN GRAIN-DOORS FOR RAILWAY-CARS.

Specification forming part of Letters Patent No. 118,339, dated August 22, 1871; reissue No. 7,328, dated October 3, 1876; application filed September 9, 1876.

*To all whom it may concern.*

Be it known that we, MILES H. CARD, of Freeport, in the county of Stephenson and State of Illinois, and LEVI SAFFORD, of Chicago, in the county of Cook and State of Illinois, have invented new and useful Improvements in Grain-Doors for Railway-Cars; and we declare that the following is a full and clear description thereof, reference being had to the accompanying drawing, which forms a part of this specification, and in which—

Figure 1:
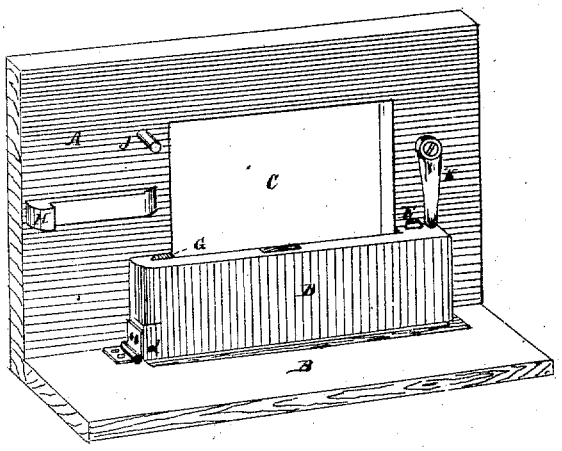
Figure 2:
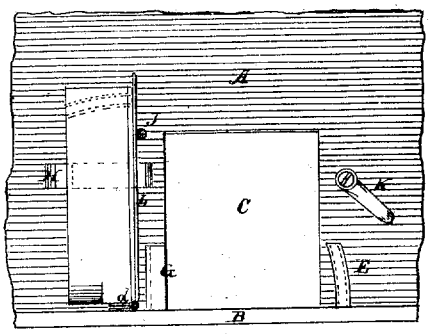

Figure 1 is a perspective view of our invention from the interior of the car; and Fig. 2 is a front elevation from the same point of view, showing the door opened.

Like letters of reference made use of in the several figures indicate like parts.

In said drawing, A represents the side of an ordinary freight-car, such as are used upon railways for transporting grain. B is the floor thereof; and C the common doorway, shown open. D represents our grain-door hinged to the car at one of its ends in such manner that when swung upon the hinge it moves in an edgewise radial direction, and remains at all times in a plane parallel to the plane of the side of the car.

The door is inside of the car, and bears against the car side, which prevents it from giving way to the pressure of the grain.

In order that there may be as little shaking and motion as possible, and in order that the door may be held firmly to its place when closed, we form between the door and the car side a connection at the free end of the door, extending for the height of the door. It is essential that this connection shall consist of a lap extending from one of the two parts—the door or the car side—over the other, and that it shall be curved in form to accommodate the motion of the door. The connection illustrated in the drawing consists of a double lap or dovetail-curved shoulder-piece, E, in one part, being placed upon the car side, and of a curvilinear dovetail groove in the other part or door. When the door is closed the curved shoulder sets over the portions of the door within it, and serves to prevent lateral play and loss of grain.

An abutment, G, may be placed at the other side of the doorway, and, being beveled at its inner side to fit an offset in the door, will serve to form a close joint upon this side of the doorway, if desired.

H is a stop, and J a pin for the purpose of retaining the door in position when opened; and K is a button or detent for securing the door when closed.

L is a flap or strip of flexible material such as canvas, leather, rubber cloth, or similar substance, secured to the bottom of the door, and extending into the car a short distance to lie upon the floor thereof. When the car is full the weight of the grain upon this flap or "lagging" makes the joint between the door and the floor tight against leakage, assisted in a measure by the material immediately under the door itself acting as a packing. This flap enables us to dispense with the troublesome lathing commonly fitted to the door-sill of grain-cars at each side of the door.

Having thus described our invention, what we claim, and desire to secure by Letters Patent, is—

1. The combination, with the imperforate grain-door hinged at one end to the car in such manner as to "up end" in opening, of a curved shoulder-piece at the other end forming a lap-joint with the door, and connecting the door with the car side, substantially as and for the purposes set forth.

2. The combination, with the up-ending car-door, of the lagging or flap on the bottom of the door, substantially as specified.

MILES H. CARD.
LEVI SAFFORD.

Witnesses:
JOHN W. MUNDAY,
EDW. S. EVARTS.